UNITED STATES PATENT OFFICE.

GEORGE A. CUMMINGS, OF BONDVILLE, VERMONT.

METHOD OF MANUFACTURING FIREPROOF COMPOSITION.

1,028,193. Specification of Letters Patent. Patented June 4, 1912.

No Drawing. Application filed March 22, 1910. Serial No. 550,833.

*To all whom it may concern:*

Be it known that I, GEORGE A. CUMMINGS, a citizen of the United States, residing at Bondville, in the county of Bennington and State of Vermont, have invented a new and useful Method of Manufacturing Fireproof Composition, of which the following is a specification.

The present invention aims to disclose a novel and highly efficient fire proofing compound of such nature as to be universal in its application; that is, it may be applied to fences, buildings, railway ties, etc.

The invention also aims to provide a compound for this purpose which will be valuable for use in protecting timber lands and railway track ways.

In carrying out the invention, fifty pounds of unslaked lime is spread out in a mixing box or bin of such size that the mass will cover the bottom of the box to a depth of about four inches. The lime is then sprinkled with sufficient water to slake it and keep it sufficiently wet so that it will not become highly heated. After the lime has become slaked, ten pounds of Portland cement is mixed with the lime and then half a bushel of coarse salt is dissolved in forty gallons of water, a portion of this solution of salt being added to the mixture of lime and cement and the mass being then thoroughly mixed until all lumps are disintegrated, after which such other portion of the salt solution is added as to render the mixture about the consistency of whitewash. The compound is then ready for use and may be applied with a brush or may be sprayed upon the structure to be protected.

What is claimed is:

A method of manufacturing a fire-proof compound which consists in slaking fifty pounds of lime with sufficient water to prevent heating, then mixing ten pounds of Portland cement with the lime, then dissolving one-half bushel of salt in forty gallons of water, then thoroughly mixing a portion of the salt solution with the other ingredients to produce a smooth mass, and finally mixing the remainder of the salt solution with the mass.

In testimony that I claim the foregoing as my own, I have hereto affixed my signature in the presence of two witnesses.

GEORGE A. CUMMINGS.

Witnesses:
JULIUS J. JOHNSON,
HERBERT L. GORDON.

Copies of this patent may be obtained for five cents each, by addressing the "Commissioner of Patents, Washington, D. C."